United States Patent [19]

Mally

[11] Patent Number: 4,967,652
[45] Date of Patent: Nov. 6, 1990

[54] PRESSING SYSTEM FOR SHAPING BACON BELLIES AND THE LIKE

[75] Inventor: Timothy G. Mally, Oregon, Wis.

[73] Assignee: Oscar Mayer Foods Corporation, Madison, Wis.

[21] Appl. No.: 285,150

[22] Filed: Dec. 15, 1988

[51] Int. Cl.$^5$ .............................................. B30B 15/26
[52] U.S. Cl. ...................................... 100/43; 100/48; 100/53; 100/153; 100/232; 100/910; 425/140; 364/476
[58] Field of Search ................... 99/349, 426; 100/42, 100/43, 99, 53, 153, 232, 910, 45, 48, 50, 215, 218; 426/231, 513; 425/140, 141, 135; 364/476

[56] References Cited

U.S. PATENT DOCUMENTS

| | | | |
|---|---|---|---|
| 2,850,966 | 9/1958 | Dohm, Jr. | 100/232 |
| 2,880,668 | 4/1959 | Cranke | 100/232 |
| 2,937,097 | 5/1960 | Draudt et al. | |
| 3,040,654 | 6/1962 | Opie | 100/53 |
| 3,144,893 | 8/1964 | Dahms | |
| 3,146,697 | 9/1964 | Dohm, Jr. et al. | 100/53 |
| 3,179,039 | 4/1965 | Christensen | 100/42 |
| 3,229,621 | 1/1966 | Decker et al. | 100/232 X |
| 3,285,161 | 11/1966 | Clemens et al. | 100/232 X |
| 3,326,120 | 6/1967 | Schneider et al. | 100/232 X |
| 3,727,545 | 4/1973 | Madsen et al. | 100/53 |
| 3,901,140 | 8/1975 | Dohm, Jr. | 100/232 X |
| 4,034,137 | 7/1977 | Hofer | 264/258 |
| 4,354,811 | 10/1982 | Marmo | 425/140 |
| 4,531,436 | 7/1985 | Antonissen | |
| 4,532,840 | 8/1985 | Antonissen | |
| 4,572,044 | 2/1986 | Antonissen | |
| 4,580,475 | 4/1986 | Antonissen | 83/77 X |
| 4,680,187 | 7/1987 | Sheehy et al. | 426/513 X |

FOREIGN PATENT DOCUMENTS 3519701  4/1986  Fed. Rep. of Germany .

Primary Examiner—Harvey C. Hornsby
Assistant Examiner—Stephen F. Gerrity
Attorney, Agent, or Firm—Joseph T. Harcarik

[57] ABSTRACT

An apparatus and method are provided for shaping bacon bellies or similar generally compressible materials in order to impart a greater three-dimensional uniformity to such bacon bellies or the like. Parameters of individual bellies, including dimensional parameters and temperature when desired are determined. Data on these parameters are stored in an ordered fashion, which stored data are utilized to vary the extent that walls of a pressing apparatus move during a pressing operation. By this method and apparatus, each individual belly or the like is pressed and reshaped in accordance with its own specific parameters, while provision is made for avoiding overpressing due to irregularities in shape of the bacon bellies and the like.

18 Claims, 11 Drawing Sheets

PRESSING SYSTEM FOR SHAPING BACON BELLIES AND THE LIKE

BACKGROUND AND DESCRIPTION OF THE INVENTION

The present invention generally relates to an apparatus and method for shaping bacon bellies and the like. More particularly, the invention relates to an apparatus and method for pressing bacon bellies and the like in a controlled manner that is varied as needed for each individual belly or the like in order to avoid both overpressing and underpressing of any particular bacon belly or other compressible item. The system functions by measuring parameters of each of a series of items, and appropriate data corresponding to these parameters are used for controlling the length of movement of movable walls of a three-dimensional press within which the bacon belly or the like is confined. The system can also accomplish flattening of cured bacon bellies so as to substantially remove curling formed therein during curing of the green bacon belly.

It is of course well known that raw or green bacon bellies are processed into sliced slabs of bacon. A much sought after attribute of drafts of sliced bacon is uniformity. From the standpoint of quality control, processing and packaging efficiency, it is desirable that a package of bacon slices be as close as possible to the specified package weight, such as one pound or the like. Often, in order to avoid the chance of selling an underweight package of bacon, the processor will add an extra slice or slice portion to a package. This represents a loss to the processor, inasmuch as commercially marketed packaged bacon products are sold according to nominal product weight or package type or size, rather than according to the precise weight of meat in each individual package.

Another aspect of sought-after uniformity for sliced bacon products is to have each individual slice be of substantially the same size and shape. It is, for example, generally undesirable to have bacon slices that vary in shape and/or size to a significant extent. At times, particularly non-uniformly shaped slices are made from portions of bacon bellies that are exceptionally uneven or generally misshapen, and these types of slices can often be included in a bacon draft that is then packaged.

It has generally been appreciated heretofore that uniformity objectives of these types can be achieved in part by subjecting the bacon belly to a pressing operation prior to its actual slicing by a bacon slicer mechanism. Generally speaking, these heretofore practiced pressing operations are useful in obtaining some degree of uniformity for at least some bacon bellies. It is often the case, however, that various individual bacon bellies are underpressed and others are overpressed by these types of pressing operations. If a bacon belly is underpressed, then its overall shape and appearance are not adequately changed, or perhaps at times the pressing is not adequate to overcome the generally elastic characteristics of a whole bacon belly. At other times, and with other bacon bellies, overpressing can occur, which typically results in the formation of undesirable wrinkles in the overpressed bacon belly. These wrinkles can cause yield losses and tears in the meat fibers, as well as result in the formation of cracked slices when the bacon belly is subsequently sliced into strips of bacon.

In order to better understand the difficulties associated with pressing a bacon belly, it must be appreciated that processed bacon bellies typically arrive at a pressing station in various sizes of thickness, width and length. With the pressing devices operating at pre-set pressing dimensions, they cannot easily accommodate the range of belly sizes normally distributed throughout production runs. Often, as many as forty percent of the bellies are damaged by overpressing, which typically results in transverse and lateral buckling. Bacon bellies entering these presses have been cured, and they exhibit an irregular topography. To a certain extent, bellies can be classified according to weight categories, but weight alone does not provide an adequate indication of the shape of an individual belly.

Some bacon bellies may be, when compared with an average bacon belly, thinner, wider or longer than may be considered to be typical, these variables depending upon the particular animal from which the belly originated. Such thin, wide and/or long bellies will buckle much more quickly than other bellies which can be characterized as being thicker, narrower and/or shorter than an average belly having a typical size and shape. In addition, a belly that is generally warm will buckle more quickly than one that is of a colder temperature. These variables, along with the speed of pressing, are all independent and each affects the pressing operation. A belly that is buckled or wrinkled or that is otherwise damaged by overpressing often has to be discarded, thereby creating yield losses.

Another aspect of bacon belly processing that can lead to non-uniformity is the fact that bacon bellies tend to curl, primarily along their longitudinal ends or edges, when the green belly is cured. This is due in large measure to the fact that a bacon belly is composed of domains of lean and domains of fat, which cure at different rates. Cured bellies tend to curl generally along their longitudinal edges, and some bellies curl much more than others. An especially curled belly can result in improper alignment within the pressing device or otherwise make handling of the especially curled bacon bellies much more difficult than ones that are relatively flat.

It has been found that, by proceeding in accordance with the present invention, the uniformity in shape, size and condition of a series of bacon bellies is enhanced. A bacon belly that has curled to any extent, including to a very large degree so as to form a substantially closed curl, is generally flattened, when desired. In an important aspect of the present invention, bacon belly uniformity of shape is enhanced by pressing, while greatly minimizing any possible damage to each individual bacon belly. At the same time, no bacon belly will be underpressed to such an extent that the belly will retain its non-uniform topography and appearance, rather than be pressed into a more desirable shape.

In summary, the present invention includes an apparatus and method that is of the so-called smart system type whereby the operating apparatus and method are tailored according to the particular dimension and condition parameters of each individual bacon belly or the like that is processed thereby. These parameters are monitored and measured for each individual bacon belly as it is conveyed along the system. Data thus collected are used to control the extent that each particular belly is pressed in accordance with its actual dimension and condition parameters. Included is a press device having movable walls and means for controlling the amount of movement thereof in a manner dictated by the size and condition parameters for each individual bacon belly or the like. In this manner, each bacon belly is pressed and reshaped in accordance with its own specific parameters. In addition, when desired, the apparatus and method also function to flatten curled bacon bellies at a location upstream of the pressing device.

It is a general object of the present invention to provide an improved apparatus and method for imparting uniformity to a supply of articles such as bacon bellies according to specific parameters of each individual bacon belly.

Another object of this invention is to provide an improved apparatus and method for successfully handling a stream of bacon bellies or the like, which stream includes items that are widely divergent with respect to the extent of curl exhibited by each individual item.

Another object of the present invention is to provide an improved apparatus and method for pressing a conveyed supply of cured bacon bellies and the like while minimizing damage to the bacon bellies caused by overpressing.

Another object of the present invention is to provide an improved apparatus and method wherein bacon bellies and the like that have a wide divergence in size and shape can be handled in a continuous stream on an automatic and automated basis.

Another object of the present invention is to provide an improved apparatus and method which perform in a so-called smart manner and without requiring operator adjustment for each individual bacon belly.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
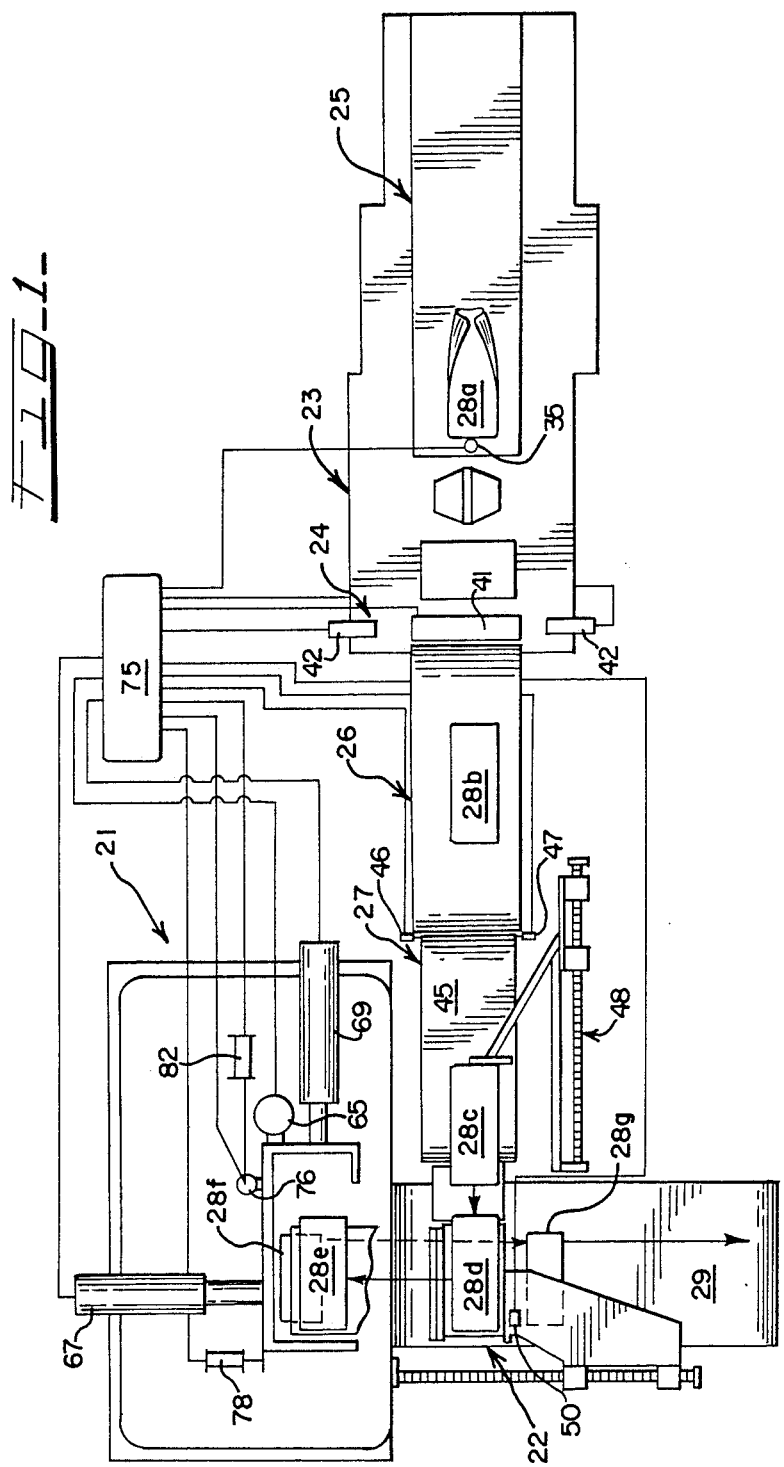
FIG. 1 is a top plan view of an apparatus including features according to the present invention.

FIG. 1 illustrates a suitable layout for a shaping system according to the present invention when it is desired to include a flattening station as well as parameter measurement means and a pressing apparatus that varies its pressing operation according to the particular individual belly being processed by the system. The pressing apparatus is generally illustrated by reference numeral 21. Also illustrated is a mechanism generally designated as 22 which loads and unloads a series of bacon bellies or the like from the pressing apparatus 21. A flattener apparatus is generally designated at reference numeral 23, and a dimension measurement system is generally illustrated at 24. A loading and centering conveyor 25 is also illustrated, as is a conveying weight scale 26 and a transfer conveyor apparatus 27.

Generally describing the interrelationship of the various components of the line or system that is illustrated in FIG. 1, a series of bacon bellies 28a, 28b, 28c, 28d, 28e, 28f and 28g progress along the system. For ease of description, the particular bellies illustrated in FIG. 1 will be understood to refer to a series of bellies as each passes along the location generally shown in FIG. 1. It will be further understood that bellies in addition to the number of those shown can also be handled.

Bellies 28a are fed onto the loading and centering conveyor 25 in order to provide a series of desirably spaced bellies that are centered with respect to the rest of the system, for example the flattener apparatus 23. Bellies on the loading and centering conveyor 25 tend to exhibit longitudinal curling that developed during curing, which curls may be so severe that the opposing longitudinal edges of the belly may be closely spaced from or contacting each other. The flattener apparatus 23, when provided, will operate to substantially remove this curl. At a location upstream of the pressing apparatus 21, the parameters of each belly 28b will be measured. Generally speaking, these measurements typically are carried out after operation of the flattening apparatus 23, when it is provided. The dimension measurement system 24 will obtain desired external measurements of the belly 28b, and the conveying weight scale 26 or the like will determine the weight of each belly 28b. Data collected at stations 24 and 25 are transmitted to a central processing unit or control system such as at 75, and these data are used in controlling the operation of the pressing apparatus 21. Transfer conveyor 27 moves belly 28c to a loading station of the load/unload mechanism 22, which in turn moves belly 28d into the pressing cavity of the pressing apparatus 21. After the pressing operation has been completed on belly 28f, a pressed belly 28g is deposited onto the unloading station of the load/unload mechanism 22, after which it is passed on to the next processing stage by way of an unload conveyor 29 or the like.

Figure 2:
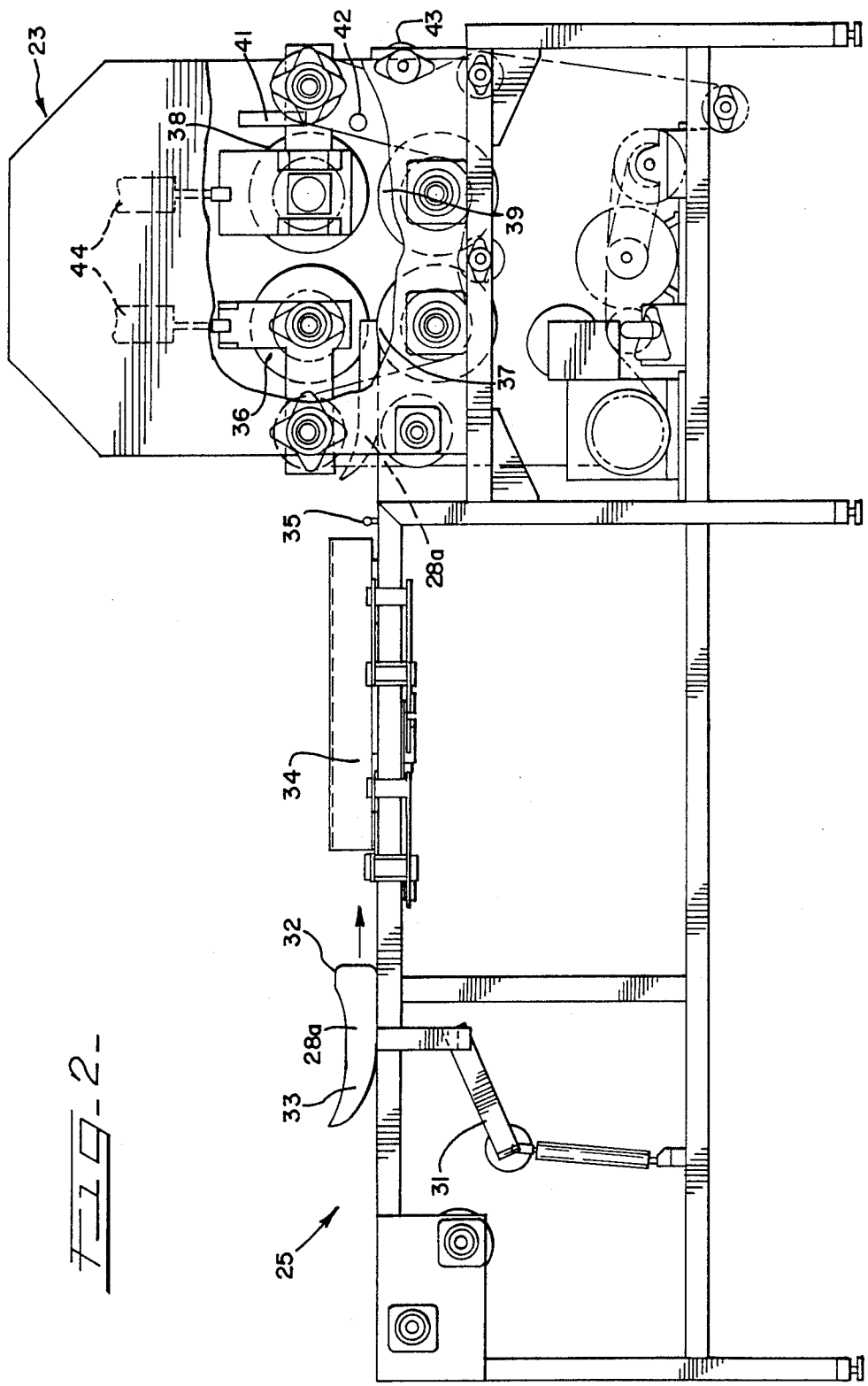
FIG. 2 is an elevational view of a flattener assembly component that can be included in the present invention.

Referring more specifically to the flattening apparatus 23, reference is made particularly to FIG. 2. Bellies 28a are moved into the flattener apparatus by the loading and centering conveyor assembly 25, which includes a typical frame arrangement and conveyor belt system (not shown) having means such as a take-up assembly 31. Bellies 28a are placed on the conveyor 25 in a manner such that its brisket end 32 is the leading end, while the rib pocket portion or flank end 33, which is the portion of a bacon belly which tends to curl much more than the brisket end 32, is the trailing end portion.

A centering assembly having one or more guide walls 34 helps to properly position the bellies 28a with respect to the entry to the flattening apparatus 23. The length of each belly 28a can be determined by a detector 35 such as a photoelectric light system of known construction and abilities. Such a length measuring device could be positioned at other locations along the apparatus, for example, at a location after the bellies have passed through the flattening apparatus 23. Length data for each individual bacon belly are stored, in ordered fashion, within the central processing unit.

Once the bacon belly 28a enters the pressing apparatus 21, it initially passes between feed rollers 36 and 37. Preferably at least the upper feed roller 36 will have a relatively narrow axial thickness so that it will "plow" a generally central longitudinal path along the belly 28a and thereby open up the curled portion 33, even when same is curled to such an extent that the flank ends of bacon belly 28a substantially touch each other. A pair of flattener rollers 38 and 39 preferably are elongated and have an axial extent much greater than that of the narrow feed roller 36. Each belly passes between these rollers in a manner of operation along the lines of that of pinch rollers in order to thereby complete the flattening of each belly.

In the illustrated flattening apparatus 23, detector means are provided for gathering data. Typical detector means that are suitable for use in this regard are sonar devices of a generally known type. For example, a plurality of sonar detectors 41 are provided for determining the thickness of each individual belly at various locations on the belly, while one or more sonar detectors 42 determine the width of each individual belly. With reference to the thickness detectors 41, same can operate in order to detect the thickest point and the thinnest point of each individual belly, which can be used to determine an average thickness or a thickness ratio.

An outfeed roller 43 helps to move the flattened bellies out of the flattener apparatus 23 and on to the next stage of the overall system. Air cylinders 44 or the like provide flattening forces to the rollers 36, 38. The force provided by the cylinders 44 can be readily adjusted to thereby vary the extent of flattening that is accomplished. For example, bellies typically will need additional flattening forces when they are at a lower temperature.

Figure 3:
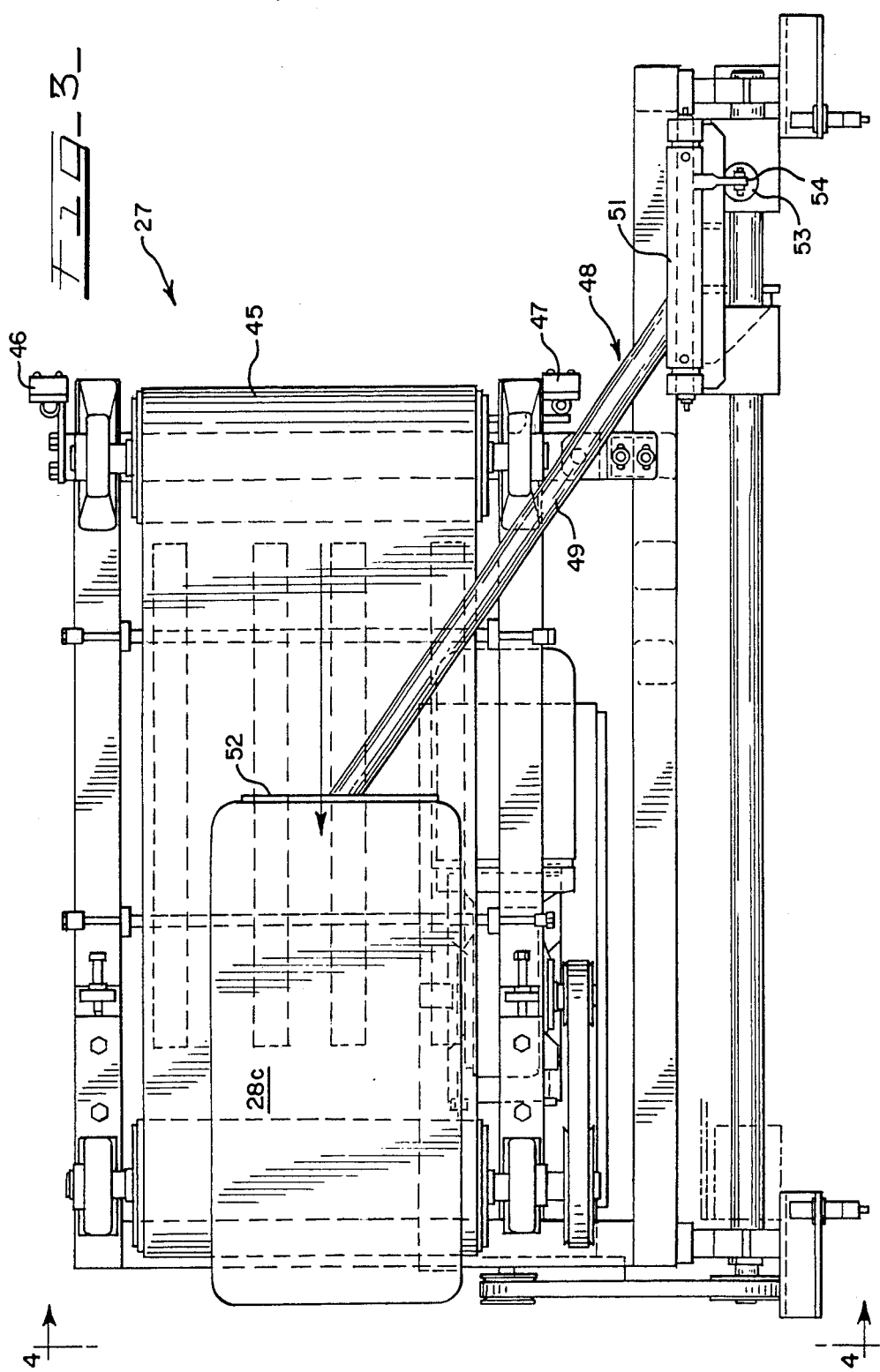
FIG. 3 is a top plan view of a transfer conveyor assembly of the type that is suitable for use in the present invention.
Figure 4:
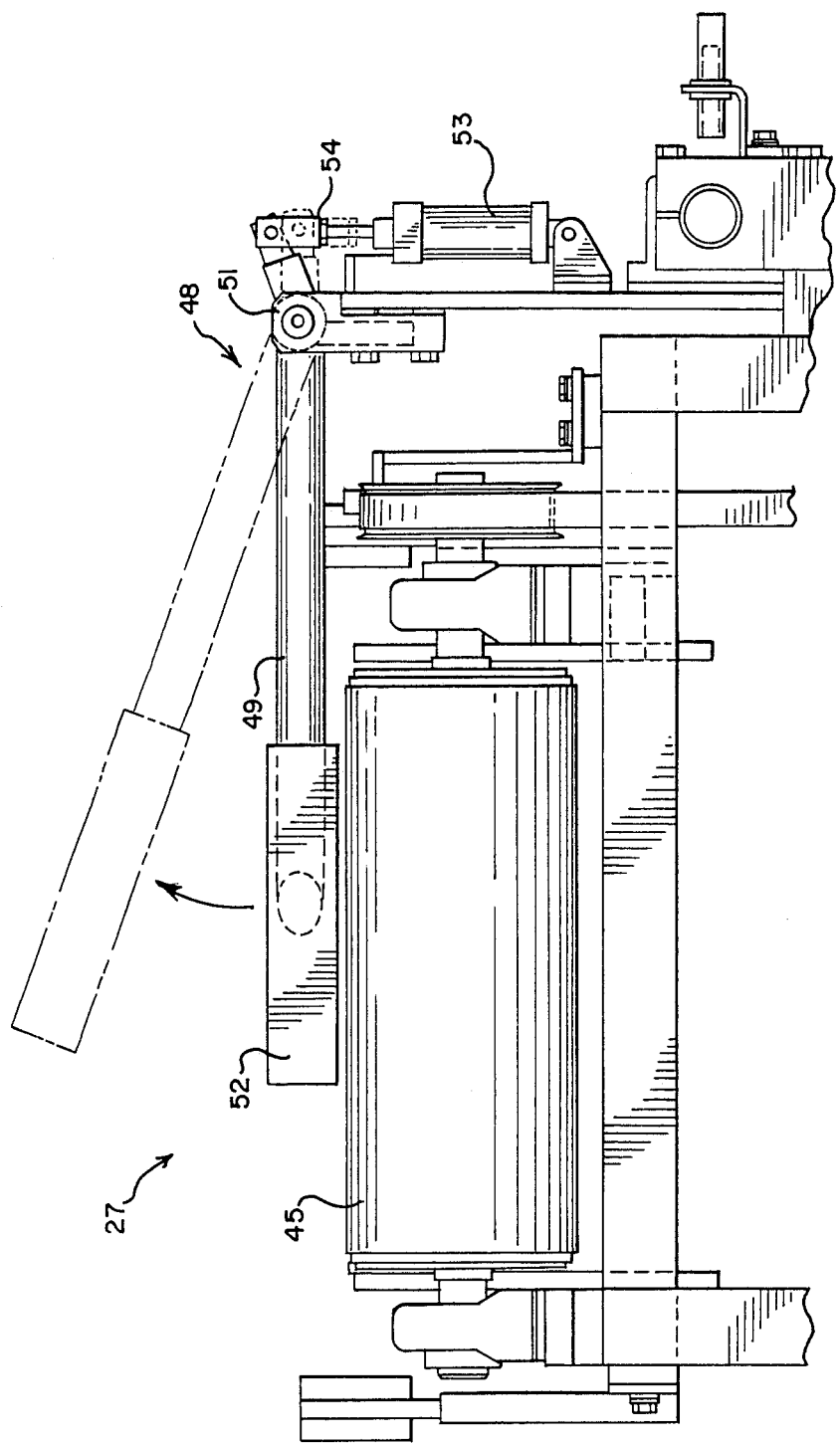
FIG. 4 is an end view of the transfer conveyor assembly illustrated in FIG. 3.

Transfer conveyor apparatus 27 is shown in greater detail in FIG. 3 and in FIG. 4. Bacon belly 28c moves onto a conveyor belt 45 for translation along the transfer conveyor apparatus 27. A photo eye source 46 and photo eye receiver 47, or similar signaling means, detect when a belly 28c progresses along the conveyor belt 45. This movement can be in association with operation of a pusher assembly or the like, generally designated as 48. Pusher assembly 48, which is an optional component, includes a pusher arm 49 mounted onto a pivot shaft 51 and has a pusher plate 52 mounted to its free end. An assembly including a piston and cylinder unit 53 and a clevis and pin attachment 54 impart rotating motion to the pivot shaft 51 in a generally known manner so that the pivot assembly will raise and lower at appropriate times. Transfer conveyor apparatus 27 moves the belly 28c into the loading station of the load-/unload mechanism. When the pusher assembly 48 is provided, this movement occurs when the pusher plate 52 is generally downwardly positioned. Rapid return thereof after delivery of a bacon belly 28c is facilitated by the pivoting action of the pusher assembly 48, whereby the pusher plate 52 and pusher arm 49 assume the raised orientation shown in phantom in FIG. 4.

Figure 5:
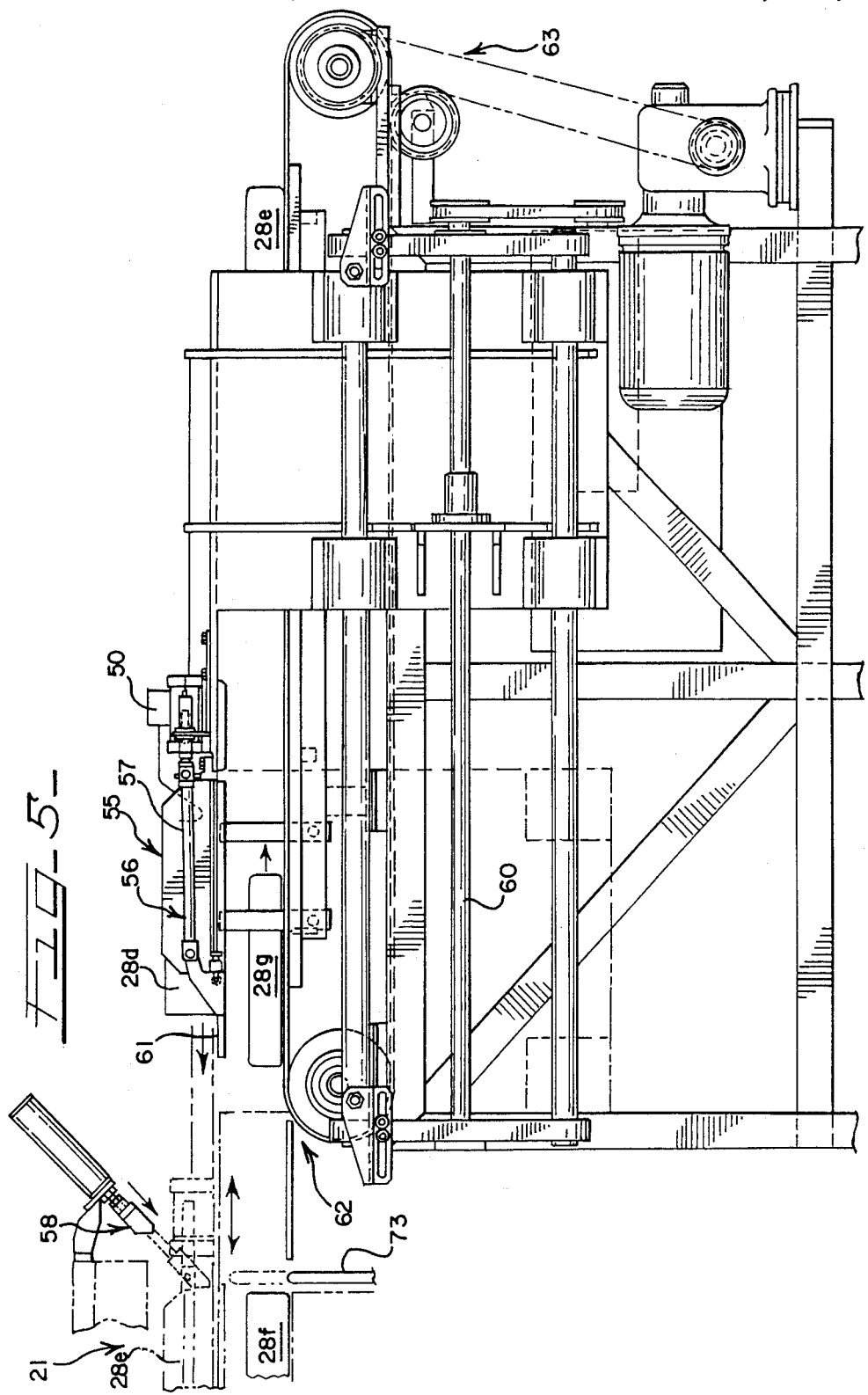
FIG. 5 is an elevational view of an assembly for loading and unloading bacon bellies and the like from the pressing apparatus according to the present invention.
Figure 6:
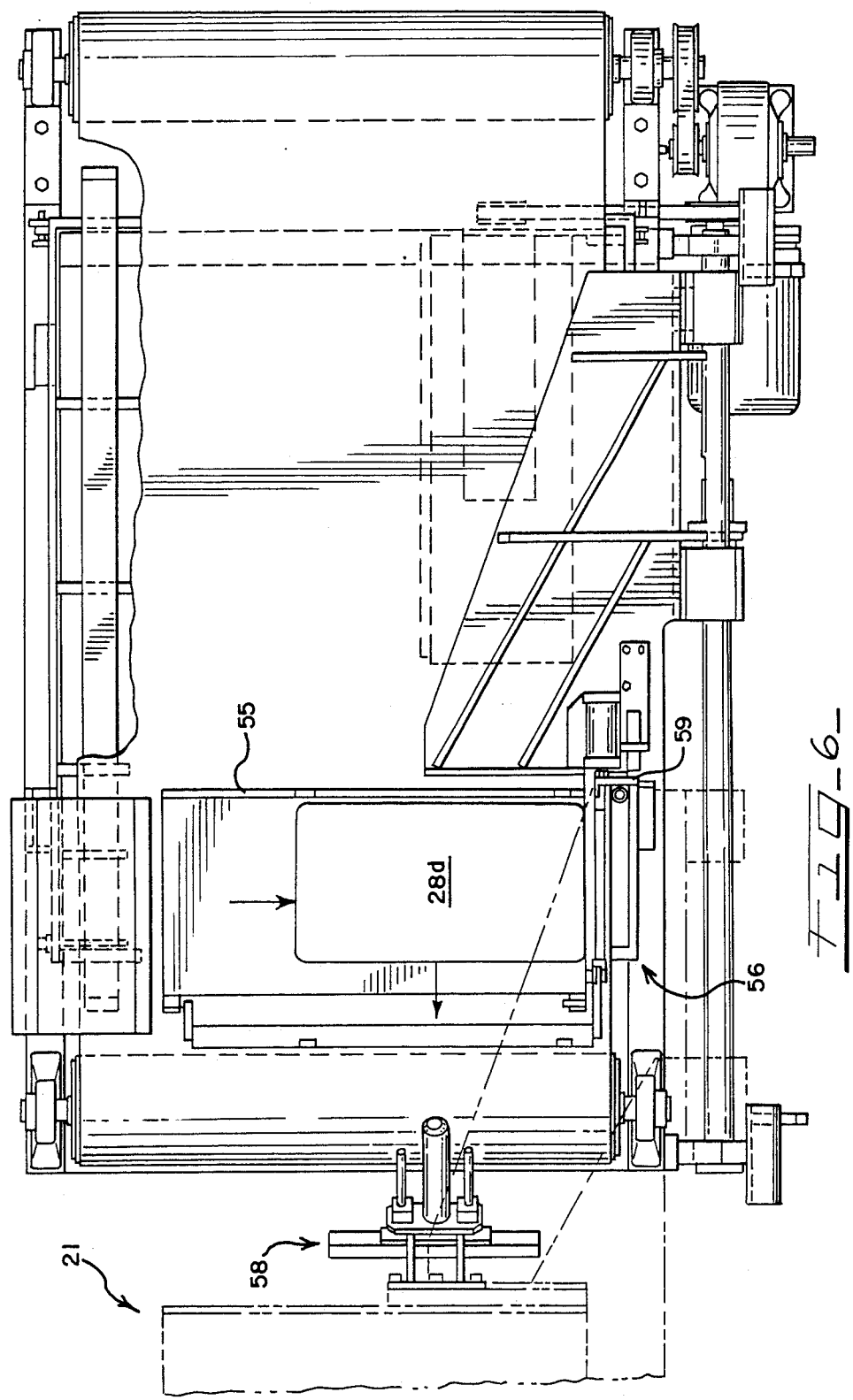
FIG. 6 is a plan view, partially broken away, of the assembly illustrated in FIG. 5.

Once the transfer conveyor apparatus 27 has moved a belly 28c onto the loading station of the load/unload mechanism 22, shown in greater detail in FIG. 5 and FIG. 6, belly 28d is in position to be fed into the pressing apparatus 21. A suitable device, such as a proximity switch 50, signals when a belly 28d is in position on a carrier assembly 55 at the loading station of the device, which loading station is illustrated on an upper level of the load/unload mechanism 22, with the unloading station being at a lower level thereof. With the carrier assembly 55 thus loaded with a belly 28d, same moves to the left as illustrated in FIG. 6 so as to be in position for final movement into the press assembly 21 by operation of a belly push-off assembly or infeed arm assembly 56. A link 57, a spring plunger 58, a rod clevis 59 and ball screw assembly 60 can be provided to cooperate in movement of the infeed arm assembly 56. If desired, the ball screw assembly can be replaced by any suitable driving means such as a piston and cylinder assembly.

With swinging gate 61 of the carrier assembly 55 at its generally horizontal orientation, the belly 28d is in position for its movement into the press cavity. Once therewithin, the swinging gate 61 moves to its downwardly directed, generally vertical orientation. Also, a stop plate assembly 58 moves generally downwardly so as to prevent the belly 28d from outward movement when the carrier assembly 55 moves out of the press cavity. Then, carrier assembly 55 moves generally outwardly; simultaneously, a pressed belly 28f is pulled out of the pressing cavity of pressing assembly 21 by the gate 61, and the belly 28e engages plate assembly 58 and slides off the carrier assembly 55, at which time belly 28e drops into the pressing cavity. By this action, pressed belly 28f is pulled onto the unloading conveyor 62 for subsequent handling of belly 28g, such as slicing or the like. A timing belt assembly 63 may be provided in order to facilitate interaction with a downstream assembly, such as a slicer line or the like.

Figure 7:
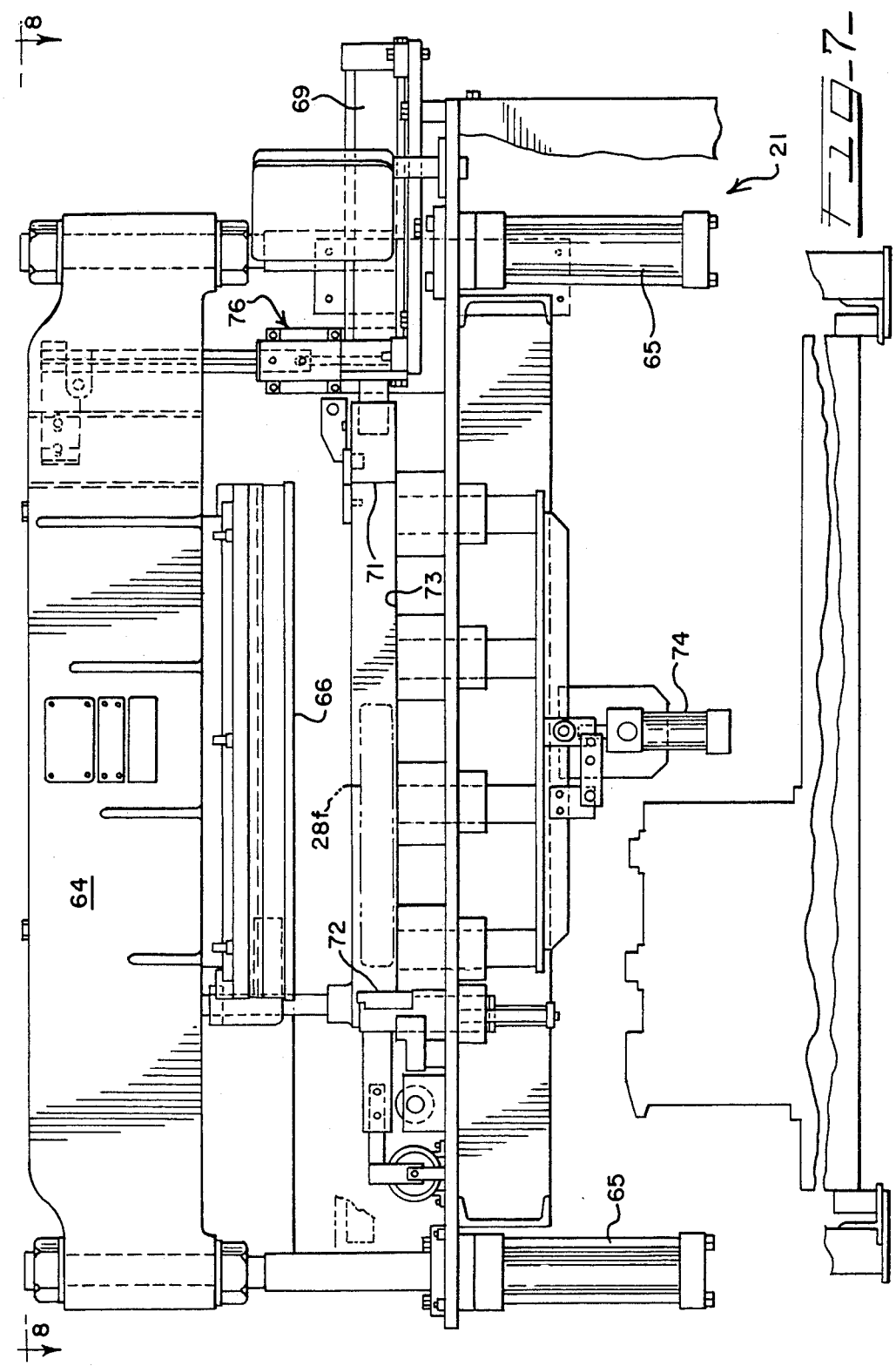
FIG. 7 is a front elevational view of the pressing apparatus suitable for use according to the present invention.
Figure 8:
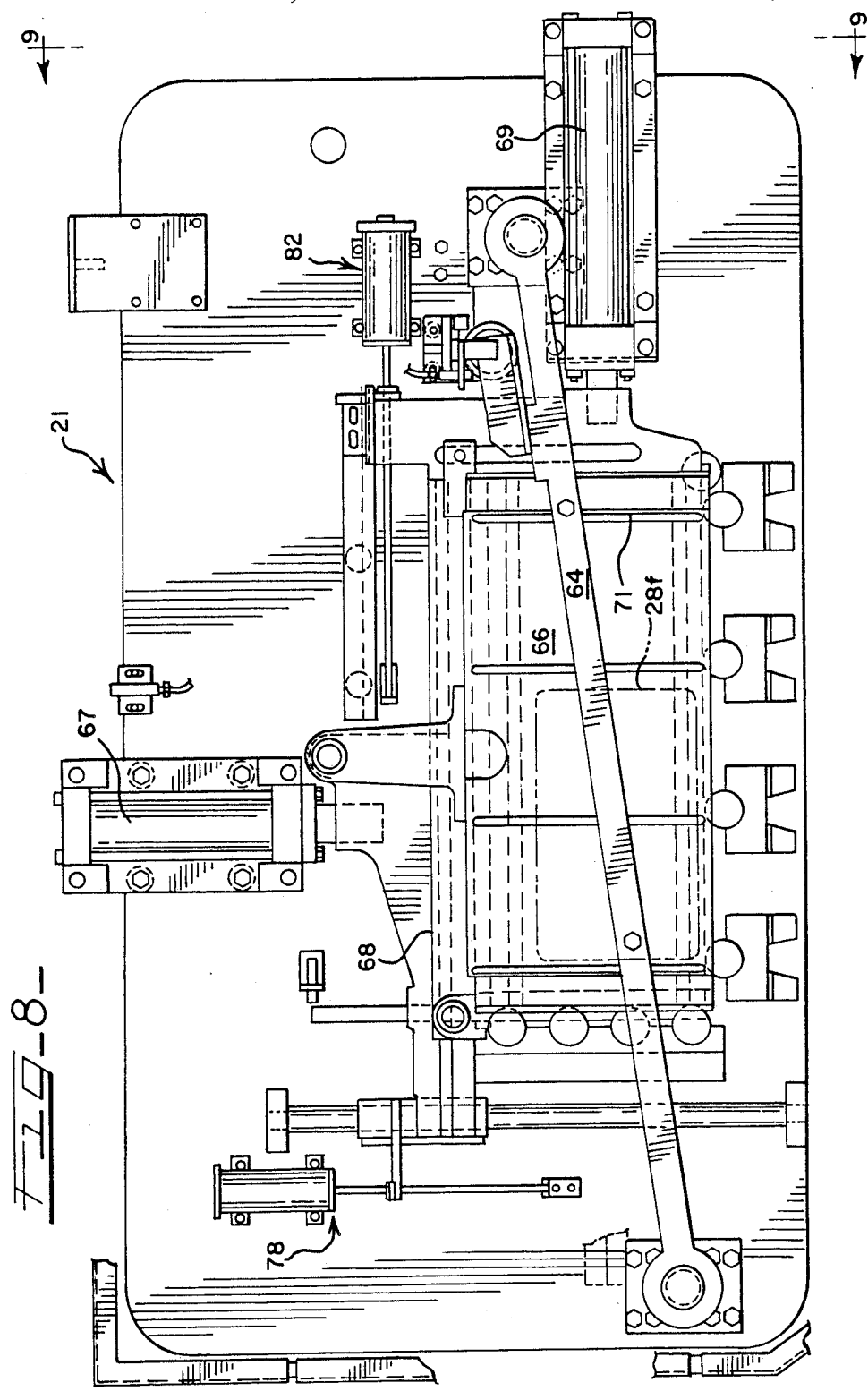
FIG. 8 is a top plan view of the pressing apparatus illustrated in FIG. 7.
Figure 9:
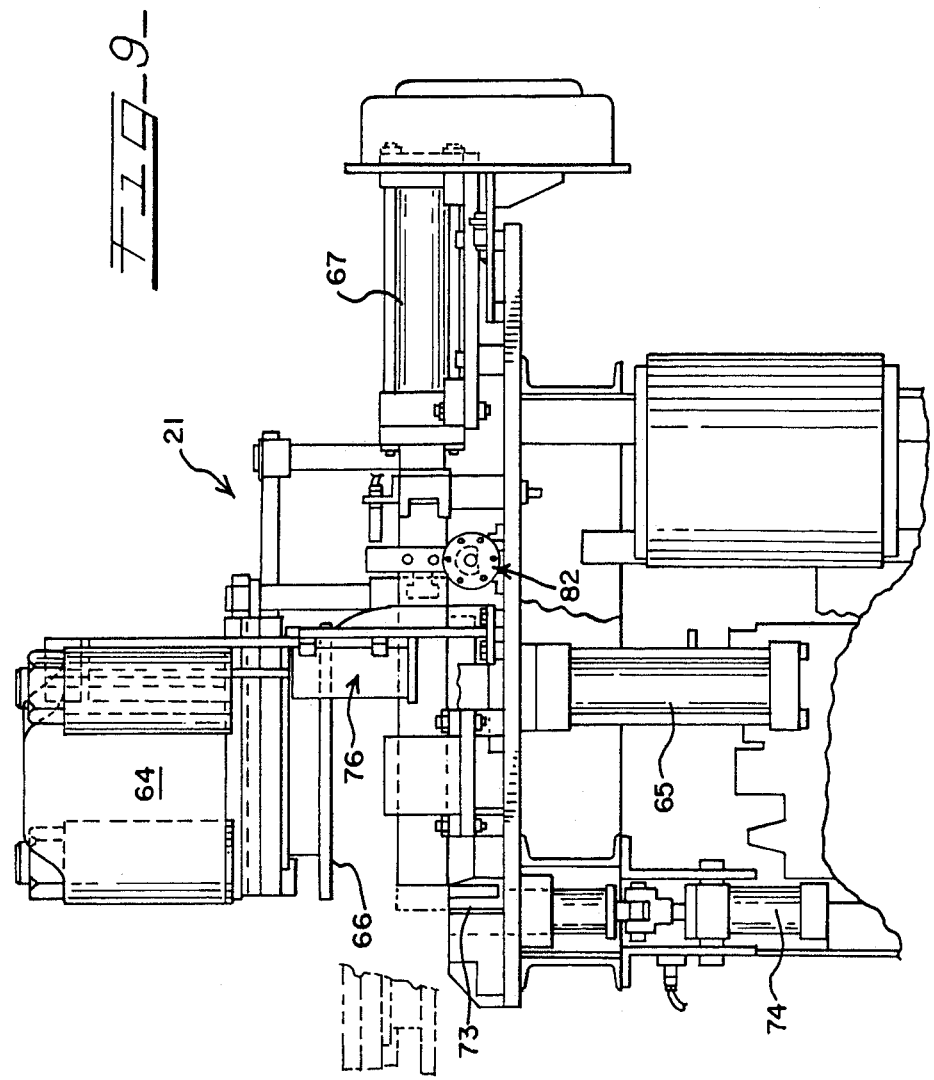
FIG. 9 is an end elevational view of the apparatus illustrated in FIGS. 7 and 8.

With more particular reference to the pressing apparatus 21, its operational details are illustrated more fully in FIG. 7, FIG. 8 and FIG. 9. Generally, three different cylinders impart motion to movable walls which compress the belly 28e against a generally opposing nonmoving wall. A disappearing bar or gate 73 moves up to complete cavity closure. Next, a top platen 64 is moved downwardly by cylinders 65, and downward pressure is applied by a horizontal pressure plate 66 secured to the top platen 64 until the belly 28f allows for no further compression, because the pressure exerted by the pressed belly 28f is in substantial equilibrium with the pressure applied by the cylinders 65.

Typically, the second step in the pressing operation will be actuated by a back cylinder 67 which moves back platen 68 so that the belly 28f is compressed along its width until it engages the opposing wall of the press cavity. Usually, this width-wise compression will continue until a calculated width is attained, as is discussed more fully herein. Next, end cylinder 69 is moved into the cavity until end platen 71 engages one end of the belly 28f and achieves compression in combination with the opposing end wall 72 of the cavity, this end cylinder 69 will compress the belly 28f until its measured length has been reduced to a length that is suitable to compress the belly adequately, and without overcompression, as is discussed more fully herein.

A central processing unit or control system 75 controls the extent of movement of the press cylinders according to data generated in the pressing apparatus as well as data input at other locations of the system, as described elsewhere herein. The amount of actual movement of the pressing cylinders can be closely controlled by respective feedback devices incorporating linear variable displacement transducers or the like. A top cylinder transducer feedback assembly 76 for tracking movement of the top platen 64 is provided, as is a back cylinder transducer feedback assembly 78 and an end cylinder transducer feedback assembly 82. These linear variable displacement transducers operate in a generally known manner.

Figure 10:
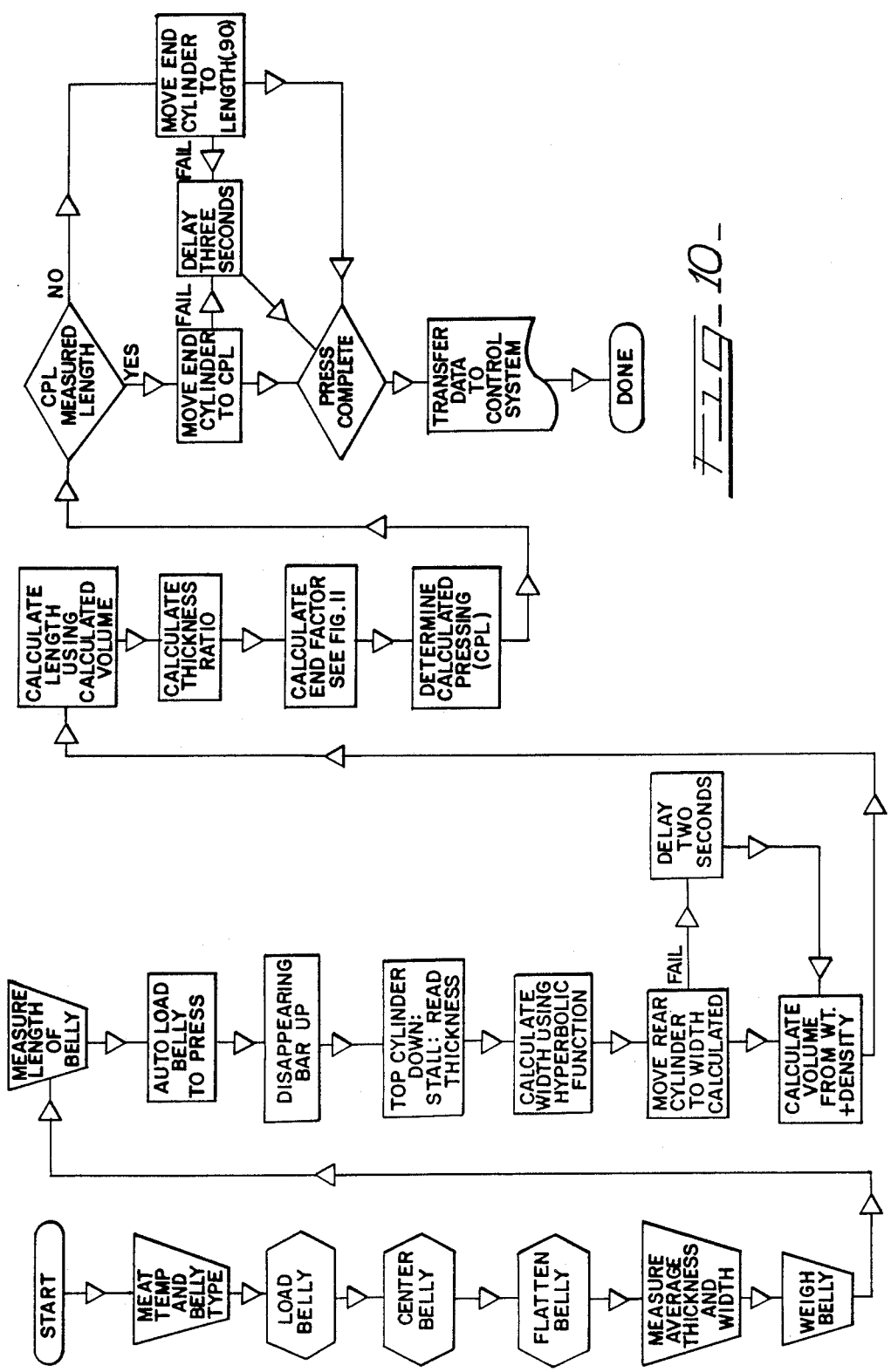
FIG. 10 is a flow chart illustrating the operational aspects and certain data channel circuitry suitable for use in accordance with the present invention.

FIG. 10 illustrates the various steps of the several assemblies illustrated in FIG. 1, while also providing further details regarding the data channel circuitry that is carried within or in association with the central processing unit or control system 75. FIG. 10 also provides details regarding the sequence of various steps that are carried out when processing a belly through all of the apparatus components that are illustrated in FIG. 1.

The temperature of the belly is measured and stored, and the type of belly can also be input and stored. Different empirically generated data can be used for different types of bellies, for example whether they are standard bellies or ones that are of the centercut variety. Each belly is loaded on and centered by the loading and centering conveyor 25, after which it passes through the flattening apparatus 23. The average height and the width of the belly are measured by the dimension measurement system 24, and the belly weight is determined on the conveying weight scale 26. The length of the belly can be measured by suitable known means, such as an electric eye system or sonar system, if desired. At this stage, various parameters of this particular belly are determined, and they are stored in ordered fashion in accordance with generally known principles for use when that particular belly enters the pressing apparatus 21.

After loading the belly into the pressing apparatus 21, the disappearing bar 73 is raised in order to provide a completely closed, six-sided cavity surrounding the belly. Cylinders 65 are activated, and the top platen 64 is lowered until a stall condition is reached, thereby pressing the belly to the extent of the pressure applied by the cylinders 65. By operation of the top transducer feedback assembly 76, the height of the horizontal pressure plate 66 is read, which is input into the control system 75 as a "read thickness."

Next, suitable data channel circuitry is activated in order to determine the width to which the belly is to be pressed by the back platen 68 so as to ensure that the belly is adequately pressed, but not overpressed so as to cause undesirable buckling, wrinkling, tearing or the like. It has been determined that there is a generally hyperbolic relationship between a bacon belly width measured before pressing and a bacon belly width after it is pressed in the type of pressing apparatus described herein. That relationship can be characterized by the formula: $(x^2/a^2) - (y^2/b^2) = 1$, wherein a and b are constants derived from empirically generated bacon belly width pressing data and wherein x and y are the variables of this hyperbolic function.

In this regard, there is also a quality control minimum width for each particular type of belly, such as a standard belly or a centercut belly. If a belly is pressed to a width below these quality control limits, then the belly can be used for alternate products or the like. Accordingly, the hyperbolic function must be selected so that acceptable values to which a belly is to be pressed will not fall under these minimums. In addition, an item such as a bacon belly exhibits a certain amount of elasticity, and a belly will spring back somewhat from the amount that it is compressed. Accordingly, this spring back property is taken into consideration when determining this calculated width of the belly after width-wise compression. The width determined in accordance with these features is referred to herein by the term "calculated width."

Still referring to FIG. 10, the back cylinder 67 next is activated for purposes of carrying out the compression to the calculated width. Preferably, this movement is carried out in a manner such that the actual compression of meat material is effected at a relatively slow speed. According to the present invention, it has been determined that a relatively fast compression of a bacon belly will increase the likelihood of the development of undesirable wrinkles, folds, tears or the like. A meat item needs a minimum amount of time to be compressed in a generally uniform manner. In this regard, movement of the back cylinder can be carried out at a relatively fast speed, on the order of ten inches per second, until the back platen 68 is a short distance from the measured width of the particular belly. At this stage, the speed of extension of the back cylinder 67 is ramped down to on the order of two inches per second, which becomes the pressing speed. In the event that the back cylinder stalls without actually reaching the calculated width during a selected time interval, such as the two-second delay illustrated in FIG. 10, then the data channel circuitry moves to the next step. Such a stall would result if the pressure generated by the back cylinder is not adequate to compress the particular bacon belly to a width as small as the calculated width.

Suitable data channel circuitry are provided whereby the volume of the particular bacon belly is calculated by multiplying the weight of the bacon belly that was determined earlier in the procedure by an empirically generated density value for the particular product, such as a bacon belly. In this regard, a typical bacon belly would be approximately 40 percent lean and approximately 60 percent fat, and a ratio of this type is used to calculate the overall density of the bacon belly or the like from known fat density and lean density values.

From this volume calculation, what is referred to herein as a "calculated length" is determined. This is determined by data channel circuitry that carry out the formula: calculated length = volume/(read thickness × calculated width). This data channel circuitry is provided because of the inherent non-uniformity of bacon bellies and the like. Some bacon bellies have an exceptionally thick brisket portion together with an exceptionally thin rib pocket portion. For bellies of this type, the "read thickness" is determined when the top platen actually is engaging and compressing only the brisket portion, and the rib pocket portion is not engaged or compressed at all. This means that the read thickness does not accurately represent the actual belly thickness because it is reading the thickness of the brisket portion only, while in actuality the average thickness of this particular belly is thinner than this read thickness.

It is important to the present invention to take this into consideration; otherwise, the end cylinder 69 could overcompress the belly during subsequent lengthwise compression, thereby creating severe buckling, creasing, damage, fiber tearing or the like. For example, if the calculated length that is determined as specified above is used on a particularly non-uniform belly, then this will result in a calculated length that is too short for that particular belly inasmuch as the calculated length uses the read thickness and the calculated volume, rather than an average real thickness, which would be difficult to measure within a press cavity of the type described herein. This problem is solved in the following manner. The data channel circuitry compares the calculated length with the measured length of the belly that was determined before the particular belly entered the pressing apparatus 21. The end cylinder 69 is extended at its fast speed to a length slightly longer than the greater of this calculated length or measured length. Ramping down to the slower speed is carried out, and the extent of movement is determined according to the following procedure.

Figure 11:
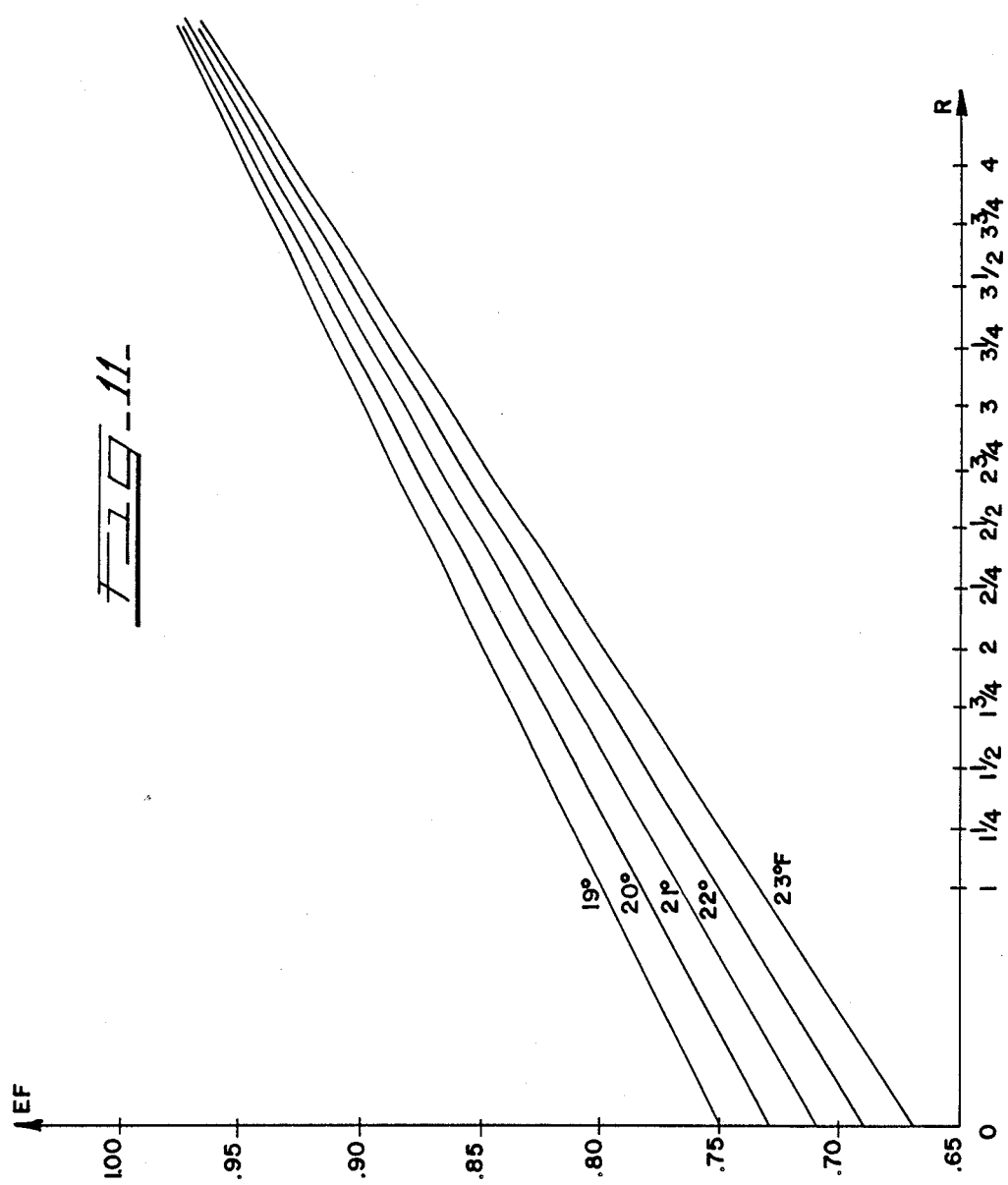
FIG. 11 is a plot of curves denoting relationships between body thickness ratio and an end factor for determining a calculated pressing length.

Consistent with FIG. 10, suitable data channel circuitry calculate a thickness ratio by dividing the maximum thickness by the minimum thickness, these thickness values having been determined earlier in the procedure, such as by the sonar detectors at the flattening apparatus 23. From this value (R), an end pressing factor (EF) is determined according to a linear relationship that is illustrated in FIG. 11. FIG. 11 shows a plot of the thickness ratio against the desired end pressing factor for bacon bellies at five different Fahrenheit temperatures. The equation for the 19° F. curve is $EF=(0.050\times R)+0.75$ wherein EF is the end pressing factor, and R is the ratio of the maximum thickness to the minimum thickness as described hereinabove. For the 20° F. curve, the formula is $EF=(0.0537\times R)+0.73$. For the 21° F. curve, the formula is $EF=(0.0575\times R)+0.71$. For the 22° F. curve, the formula is $EF=(0.0612\times R)+0.69$. For the 23° F. curve, $EF=(0.065\times R)+0.67$.

Appropriate data channel circuitry then determines the product of the end pressing factor and the calculated length in order to determine a "calculated pressing length." This calculated pressing length is compared with the product of the measured length and a suitable factor, typically 0.9. This factor is intended to indicate the minimum extent to which any bacon belly can be compressed without damage and which will at least square off rounded corners and the like. When this comparison is made, if the calculated pressing length is greater than the product of the measured length and the standard factor, then the end cylinder is extended at its ramped down speed until a target location is reached which corresponds to the calculated pressing length. In the event that the calculated pressing length is less than the product of the measured length and the standard factor, then the extension of the end cylinder is to a target location corresponding to the product of the measured length and the standard factor.

In the event that the target length is not achieved within a selected time, for example three seconds, due to cylinder stall, then the data channel circuitry indicate that the pressing is completed, and all cylinders are retracted, with data being transferred to control system 75 as desired. At this stage, the pressed belly is moved onto the unload conveyor 29.

While particular embodiments of the invention have been described, it will be apparent to those skilled in the art that various modifications thereof may be made without departing from the true spirit and scope of the invention. Accordingly, it is intended by the appended claims to cover all such modifications and equivalents which embody the inventive features as defined in the claims.

I claim:

1. A pressing system for shaping bacon bellies and the like, comprising:
    means for measuring dimensional parameters of each of a series of bacon bellies being conveyed along a designated pathway;
    a control system that receives data, operates on said data and transmits signals therefrom;
    said control system including means for receiving from said measuring means and storing said measured dimensional parameters in an ordered manner with respect to each of said bacon bellies;
    means for receiving and for pressing each of said bacon bellies in an ordered manner, said receiving and pressing means include movable walls;
    said control system including means for transmitting signals to means for moving said movable walls according to said measured dimensional parameters for each of said bacon bellies; and
    said control system and moving means cooperate to transform said measured dimensional parameters into signals for moving said movable walls to exert pressure on each belly to compress and reshape each belly by reducing a dimension thereof to a target dimension value that is determined for each said belly by said data received by, operated on and transmitted from said control system to said moving means.

2. The pressing system according to claim 1, wherein said system further includes means for flattening curled bacon bellies, said flattening means being upstream of said receiving and pressing means.

3. The pressing system according to claim 2, wherein said flattening means includes a plurality of rollers including a roller having an axial extent which is relatively narrow, whereby said flattening means is for entering, opening and flattening a curled portion of a bacon belly.

4. The pressing system according to claim 1, wherein said measuring means are for determining a measured width, a measured length, and multiple thickness measurements for each belly.

5. The pressing system according to claim 4, wherein said receiving and pressing means includes top pressure plate means for exerting a pressure onto the top surface of each belly, width pressure plate means for exerting pressure on each belly in a direction to compress its width to a calculated width, and length pressure plate means for exerting pressure on each belly in a direction to compress its length to a calculated length or a percentage of its measured length, whichever is the shorter belly length.

6. The pressing system according to claim 1, wherein said receiving and pressing means includes top pressure plate means for exerting pressure onto the top surface of each belly, and said control system includes top feedback means for detecting and reporting as a read thickness the interface between the top pressure plate and the top surface of the belly.

7. The pressing system according to claim 1, wherein said receiving and pressing means includes width pressure plate means for exerting pressure on each belly in a direction to compress its width to a calculated width, and said control system includes data channel circuit means for determining said calculated width from a width of said belly that had been measured by said dimensional parameters measuring means, said calculated width data channel circuit means including a hyperbolic data channel means for converting said measured width into said calculated width.

8. The pressing system according to claim 7, wherein said hyperbolic data channel means includes means for maintaining a minimum calculated width.

9. The pressing system according to claim 1, wherein said receiving and pressing means includes width pressure plate means for exerting pressure on each belly in a direction to compress its width to a calculated width, and wherein said width pressure plate means further includes movement means for varying the speed of the pressure plate in its pressure exerting direction in order to ramp down the pressure plate speed from one speed to a slower speed at which compression of the bacon belly is accomplished.

10. The pressing system according to claim 1, wherein said receiving and pressing means includes length pressure plate means for exerting pressure on each belly in a direction to compress its length to a calculated length, and said control system includes data channel circuit means for determining said calculated length, said length data channel circuit means including a multiplier circuit that determines a calculated volume of the belly within the receiving and pressing means, said length data channel circuit means further including a divider circuit that divides the calculated volume by the product of a thickness value and a width value for the belly within the receiving and pressing means.

11. The pressing system according to claim 10, further including top feedback means for providing said thickness value to said divider circuit, said thickness value corresponding to a location of a top pressure plate of said receiving and pressing means, said top pressure plate location being one at which said top pressure plate is in pressure exerting contact with the belly within the receiving and pressing means.

12. The pressing system according to claim 11, wherein said width value of the divider circuit is a calculated width, and wherein said receiving and pressing means includes width pressure plate means for exerting pressure on the belly therewithin until the belly is compressed to said calculated width, and said control system includes data channel circuit means for determining said calculated width from a measured width value of said storing means.

13. The pressing system according to claim 10, wherein said width value of the divider circuit is a calculated width, and wherein said receiving and pressing means includes width pressure plate means for exerting pressure on the belly therewithin until the belly is compressed to said calculated width, and said control system includes data channel circuit means for determining said calculated width from a measured width value of said storing means.

14. The pressing system according to claim 13, wherein said calculated width data channel circuit means includes a hyperbolic data channel means for converting said measured width into said calculated width.

15. The pressing system according to claim 10, wherein said storing means includes a measured length of the belly within said receiving and pressing means, wherein said length data channel circuit means further includes comparator circuit means for selecting the shorter of the calculated length and the product of the measured length and a preselected factor less than one, and wherein said length pressure plate means exerts its pressure according to the length selected by said comparator circuit means.

16. The pressing system according to claim 10, wherein said length data channel circuit means includes circuit means for determining an end pressing factor, said end pressing factor circuit means deriving the end pressing factor for the belly in the receiving and pressing means from empirical data and a ratio of maximum and minimum thickness values for said belly retrieved from said storing means, and wherein said length data channel circuit means includes a multiplier circuit that determines a calculated pressing length which is the product of said end pressing factor and said calculated length.

17. The pressing system according to claim 16, wherein said storing means includes a measured length of the belly within said receiving and pressing means, wherein said length data channel circuit means further includes comparator circuit means for selecting the shorter of the calculated pressing length and the product of the measured length and a preselected factor of less than one, and wherein said length pressure plate means exerts its pressure according to the length selected by said comparator circuit means.

18. The pressing system according to claim 1, wherein said system further includes means for infeeding and outfeeding bellies and the like into and out of said receiving and pressing means, said infeeding and outfeeding means having a shelf-like carrier means for sliding into an upper portion of the receiving and pressing means, said shelf-like carrier means infeeding a belly and the like into the receiving and pressing means during an inwardly directed stroke and dropping said belly and the like into a lower, pressing portion of the receiving and pressing means during an outwardly directed stroke, and said shelf-like carrier further includes gate means for engaging a pressed belly and the like in the lower, pressing portion during said outwardly directed stroke in order to outfeed same from said receiving and pressing means.

* * * * *